United States Patent
Tanaka

(10) Patent No.: US 7,057,750 B2
(45) Date of Patent: Jun. 6, 2006

(54) PRINTING APPARATUS, CONTROL METHOD THEREFOR, AND STORAGE MEDIUM

(75) Inventor: Tatsuya Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 10/254,506

(22) Filed: Sep. 26, 2002

(65) Prior Publication Data

US 2003/0063148 A1  Apr. 3, 2003

(30) Foreign Application Priority Data

Oct. 1, 2001 (JP) .............................. 2001-305697

(51) Int. Cl.
*G06F 15/00* (2006.01)
*H04N 5/225* (2006.01)

(52) U.S. Cl. ................. 358/1.13; 358/1.14; 358/1.15; 358/1.16; 358/1.17; 348/207.2

(58) Field of Classification Search ............... 358/1.13, 358/1.15, 1.14, 1.16, 1.17; 348/207.2
See application file for complete search history.

(56) References Cited

U.S. PATENT DOCUMENTS 6,270,271 B1 *  8/2001  Fujiwara ..................... 400/693
6,356,357 B1 *  3/2002  Anderson et al. .......... 358/1.17
6,529,522 B1 *  3/2003  Ito et al. ..................... 370/466

FOREIGN PATENT DOCUMENTS

| EP | 0 860 980 A2 | 8/1998 |
| EP | 1 069 537 A2 | 1/2001 |
| EP | 1 107 572 A2 | 6/2001 |
| GB | 2 320 787 A | 7/1998 |
| JP | 10-257119 | 9/1998 |
| JP | 10257119 A * | 9/1998 |
| JP | 11-8792 | 1/1999 |
| JP | 2001-156987 | 6/2001 |
| KR | 1999-0044165 | 6/1999 |
| WO | 97/50243 | 12/1997 |

* cited by examiner

*Primary Examiner*—Douglas Q. Tran
*Assistant Examiner*—Chan S. Park
(74) *Attorney, Agent, or Firm*—Fitzpatrick, Cella, Harper & Scinto

(57) ABSTRACT

A printing apparatus includes a slot in which a PC card which stores image data is mounted, a terminal for connecting a digital camera, and an operation panel which is operated by the user and inputs an instruction and data. Whether the digital camera is connected via the terminal is checked. If connection of the digital camera is detected, input of image data from the PC card mounted in the slot and user operation on the operation panel are invalidated. Image data is input from the digital camera and printed in accordance with digital camera operation.

16 Claims, 12 Drawing Sheets

PRINTING APPARATUS, CONTROL METHOD THEREFOR, AND STORAGE MEDIUM

FIELD OF THE INVENTION

The present invention relates to a printing apparatus which receives image data from an image supply device such as a digital camera, a memory, or the like and prints the image data on a print medium, a control method therefor, and a storage medium.

BACKGROUND OF THE INVENTION

In recent years, digital cameras (image sensing apparatuses) capable of photographing an image by a simple operation and converting the image into digital image data have been widely used. To print an image photographed by this camera and use the print as a photograph, the photographed digital image data is input from the digital camera to a PC (computer), and undergoes image processing by the PC. Then, the processed data is output to a color printer, which prints the data.

To the contrary, there have been developed color print systems capable of directly transferring digital image data from a digital camera to a color printer and printing the data without the mediacy of any PC, and so-called photo-direct (PD) printers capable of directly mounting in a color printer a memory card which is mounted in a digital camera and stores a sensed image, reading out image data stored in the memory card to the color printer, and printing the photographed image.

The photo-direct printer can be connected to a digital camera, memory card, PC, and the like. If these devices are simultaneously connected, the printer operability decreases or an operation error occurs.

SUMMARY OF THE INVENTION

The present invention has been made in consideration of the above situation, and has as its object to provide a printing apparatus which preferentially processes image data from an image supply device when the image supply device is connected, a control method therefor, and a storage medium.

It is another object of the present invention to provide a printing apparatus which increases the image print operability by validating the operation of an image supply device and invalidating the operation of another printing apparatus when the image supply device is connected, a control method therefor, and a storage medium.

In order to attain the above described objects, the printing apparatus of the present invention for printing an image on the basis of received image data, comprises; a mounting unit in which a storage medium storing image data is mounted; a terminal for connecting an image supply device for supplying image data; processing means for processing image data input via the mounting unit or the terminal; an operation unit adapted to be operated by a user and input an instruction and data; detection means for detecting whether the image supply device has been connected via the terminal; invalidation means for invalidating input of image data from the storage medium mounted in the mounting unit and operation on the operation unit when the detection means detects that the image supply device has been connected; and image print control means for printing an image on the basis of image data from the image supply device.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENT

A preferred embodiment of the present invention will be described in detail below with reference to the accompanying drawings.

Figure 1:
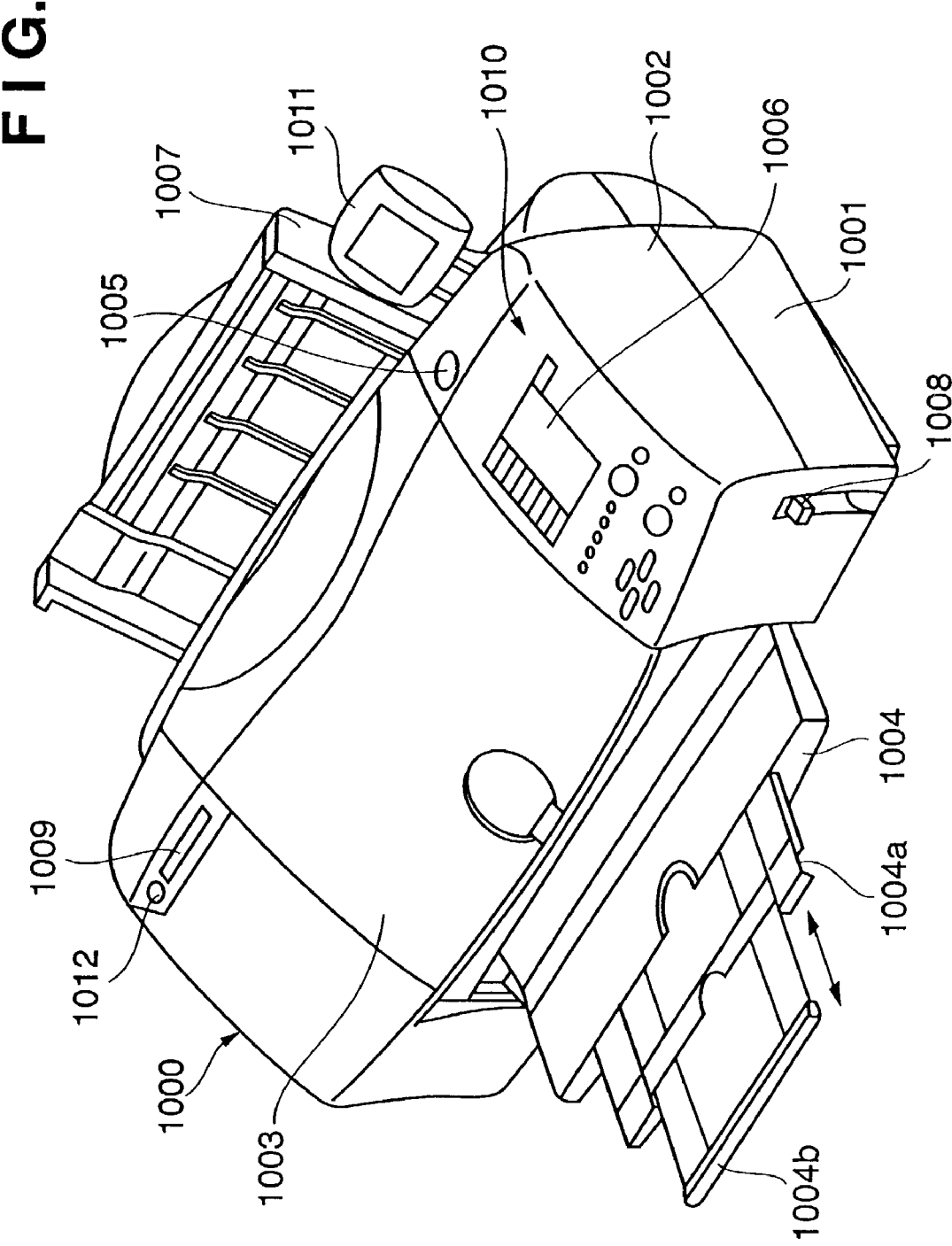
FIG. 1 depicts a schematic perspective view showing a photo-direct printer apparatus according to an embodiment of the present invention.

FIG. 1 is a schematic perspective view showing a photo-direct printer apparatus 1000 according to the embodiment of the present invention. The photo-direct printer has a general PC printer function of receiving data from a host computer (PC) and printing the data, and a function of directly reading and printing image data stored in a storage medium such as a memory card, or receiving image data from a digital camera connected to the printer apparatus and printing the data.

In FIG. 1, the main body which defines the casing of the photo-direct printer apparatus 1000 according to this embodiment has casing members: a lower case 1001, upper case 1002, access cover 1003, and discharge tray 1004. The lower case 1001 forms almost the lower half of the apparatus 1000, whereas the upper case 1002 forms almost the upper half of the main body. A combination of these cases forms a hollow structure with a storage space where each mechanism (to be described later) is accommodated. The upper and front surfaces have openings. The discharge tray 1004 is rotatably held at one end by the lower case 1001, and the opening in the front surface of the lower case 1001 is opened/closed by rotating the discharge tray 1004. To execute print operation, the discharge tray 1004 is rotated toward the front side to open the opening. Print sheets can be discharged from the opening, and the discharged print sheets can be sequentially stacked. The discharge tray 1004 houses two auxiliary trays 1004a and 1004b. These trays are selectively pulled out to enlarge/reduce the paper support area in three stages, as needed.

The access cover 1003 is rotatably held at one end by the upper case 1002 so as to open/close the opening formed in the upper surface. Opening the access cover 1003 enables exchanging a print head cartridge (not shown), ink tank (not shown), or the like accommodated in the main body. Although not shown, a projection formed on the back surface of the access cover 1003 rotates a cover opening/closing lever when the access cover 1003 is opened/closed. The lever rotation position is detected by a microswitch or the like, thereby detecting the open/closed state of the access cover.

A power switch 1005 is provided with the upper surface of the upper case 1002. An operation panel 1010 having a liquid crystal display 1006, various key switches, and the like is arranged on the right side of the upper case 1002. The structure of the operation panel 1010 will be described in detail with reference to FIG. 2. Reference numeral 1007 denotes an automatic feeder which automatically feeds print sheets into the apparatus main body; numeral 1008 denotes a paper interval selection lever for adjusting the interval between the print head and the print sheet; and numeral 1009 denotes a card slot into which an adapter capable of mounting a memory card is inserted. Image data stored in a memory card can be directly received and printed via the adapter. The memory card (PC) includes, e.g., a compact flash memory™, smart media, and memory stick. Reference numeral 1011 denotes a viewer (liquid crystal display) which is detachable from the apparatus main body and is used to display an image of one frame, an index image, and the like when images stored in the PC card are searched for an image to be printed; and numeral 1012 denotes a terminal (input terminal for inputting image data) for connecting a digital camera (to be described later). A USB bus connector 1013 in FIG. 3 for connecting a personal computer (PC) is provided with the back side of the apparatus main body.

Figure 2:
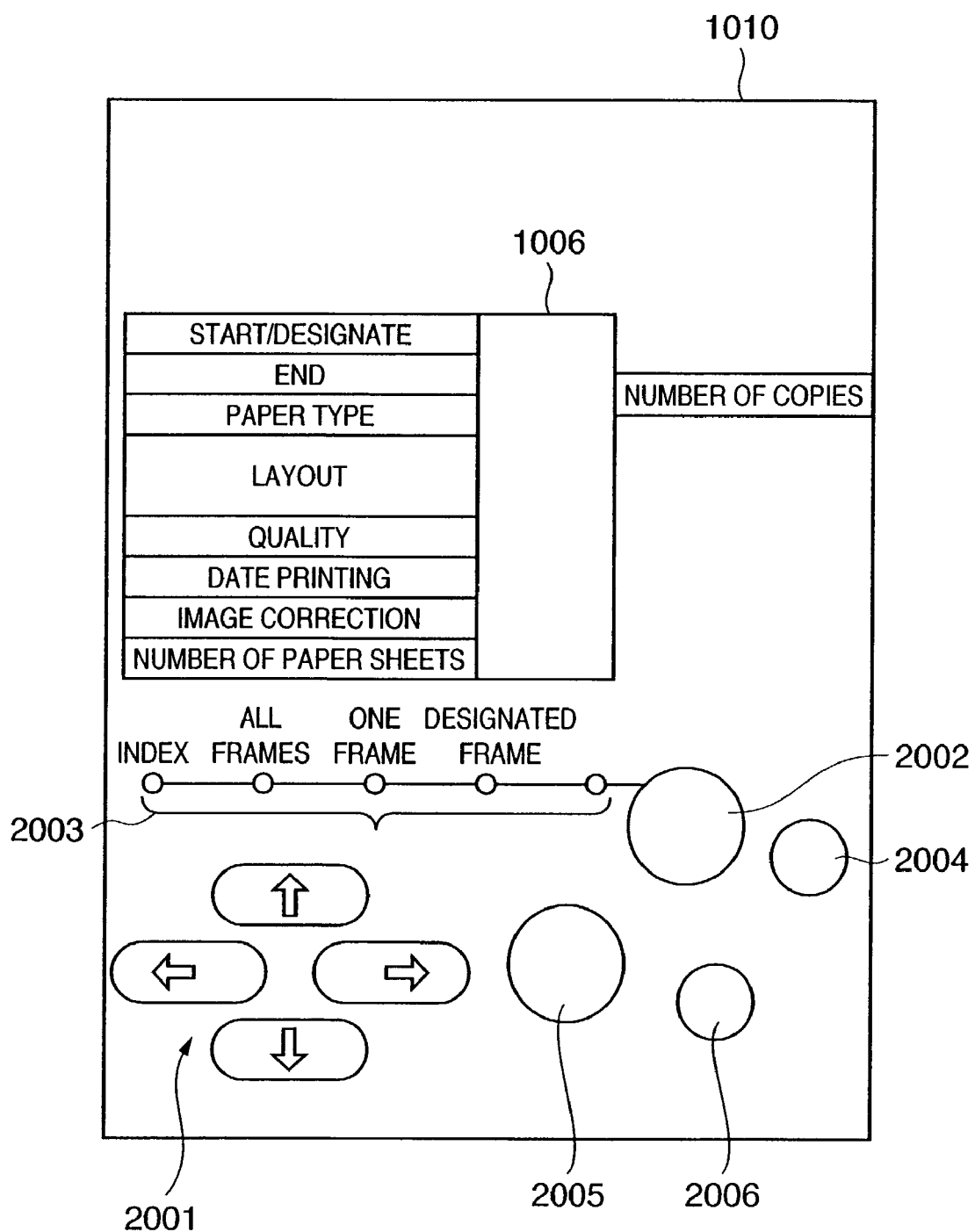
FIG. 2 depicts a schematic view showing the operation panel of the photo-direct printer apparatus according to the embodiment.

FIG. 2 is a schematic view showing the operation panel 1010 according to this embodiment.

In FIG. 2, the liquid crystal display 1006 displays menu items for various settings of data on items printed on the right and left of the display 1006. The displayed items are the first photograph number of a print range, a designated frame number (start/-designate), the last photograph number of the print range (end), the number of prints (number of copies), the type of paper (print sheet) used for printing (paper type), setting of the number of photographs to be printed on one paper sheet (layout), designation of the print quality (quality), designation whether to print a photographing date (date printing), designation whether to correct and print a photograph (image correction), and display of the number of paper sheets necessary for printing (number of paper sheets). These items are selected or designated with cursor keys 2001. Reference numeral 2002 denotes a mode key which allows switching the type of printing (index printing, printing of all frames, printing of one frame, or the like) every time the key is pressed; numeral 2004 denotes a maintenance key for performing printer maintenance such as cleaning of the printer head; numeral 2005 denotes a print start key which is pressed to designate the start of printing or establish maintenance setting; and numeral 2006 denotes a stop key which is pressed to stop printing or designate to stop a maintenance processing.

Figure 3:
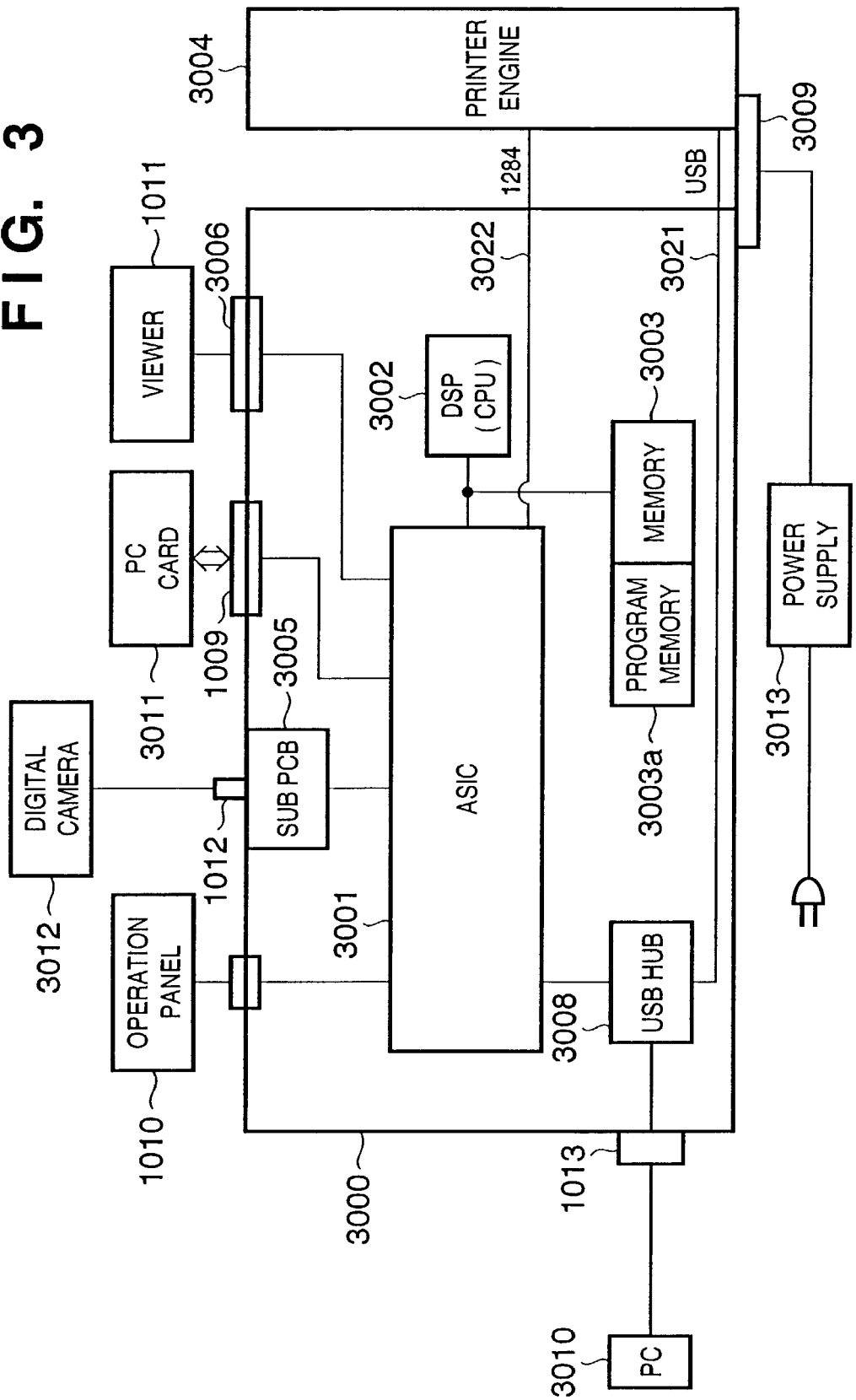
FIG. 3 is a block diagram showing the arrangement of the main part concerning control of the photo-direct printer apparatus according to the embodiment.

The arrangement of the main part concerning control of the photo-direct printer apparatus according to this embodiment will be explained with reference to FIG. 3. In FIG. 3, the same reference numerals as in the foregoing drawings denote the same parts, and a description thereof will be omitted.

In FIG. 3, reference numeral 3000 denotes a controller (control board); numeral 3001 denotes an ASIC (application specific LSI) whose arrangement will be described in detail below with reference to the block diagram of FIG. 4; numeral 3002 denotes a DSP (Digital Signal Processor) which incorporates a CPU and performs various control processes (to be described later), and image processes such as conversion from an RGB signal (RGB signal indicates three primary color signals for display and is called as a luminance signal ) to a CMYK signal (CMY signal indicates three primary color signal for printing and a CMYK signal including a black signal is called as a density signal), scaling, gamma conversion, and error diffusion; numeral 3003 denotes a memory having a program memory 3003a which stores the control program of the CPU of the DSP 3002, a RAM area which stores variables and the like in executing a program, and a memory area functioning as a work memory which stores image data and various data; numeral 3004 denotes a printer engine which is an ink-jet print type printer engine for printing a color image by using a plurality of color inks in this embodiment; numeral 3005 denotes a connector serving as a port for connecting a digital camera 3012; numeral 3006 denotes a connector for connecting the viewer 1011; and numeral 3008 denotes a USB bus hub which transmits data from a PC 3010 and outputs the data to the printer engine 3004 via a USB bus 3021 when the printer apparatus 1000 performs printing based on image data from the PC 3010. The connected PC 3010 can directly exchange data and signals with the printer engine 3004 and execute printing (functions as a general PC printer). Reference numeral 3009 denotes a power connector which receives from a power supply 3013 a DC voltage converted from a commercial AC voltage. The PC 3010 is a general personal computer. Reference numeral 3011 denotes a memory card (PC card) described above; and 3012, the digital camera.

Signal exchange between the controller 3000 and the printer engine 3004 is performed via the USB bus 3021 or an IEEE 1284 bus 3022.

Figure 4:
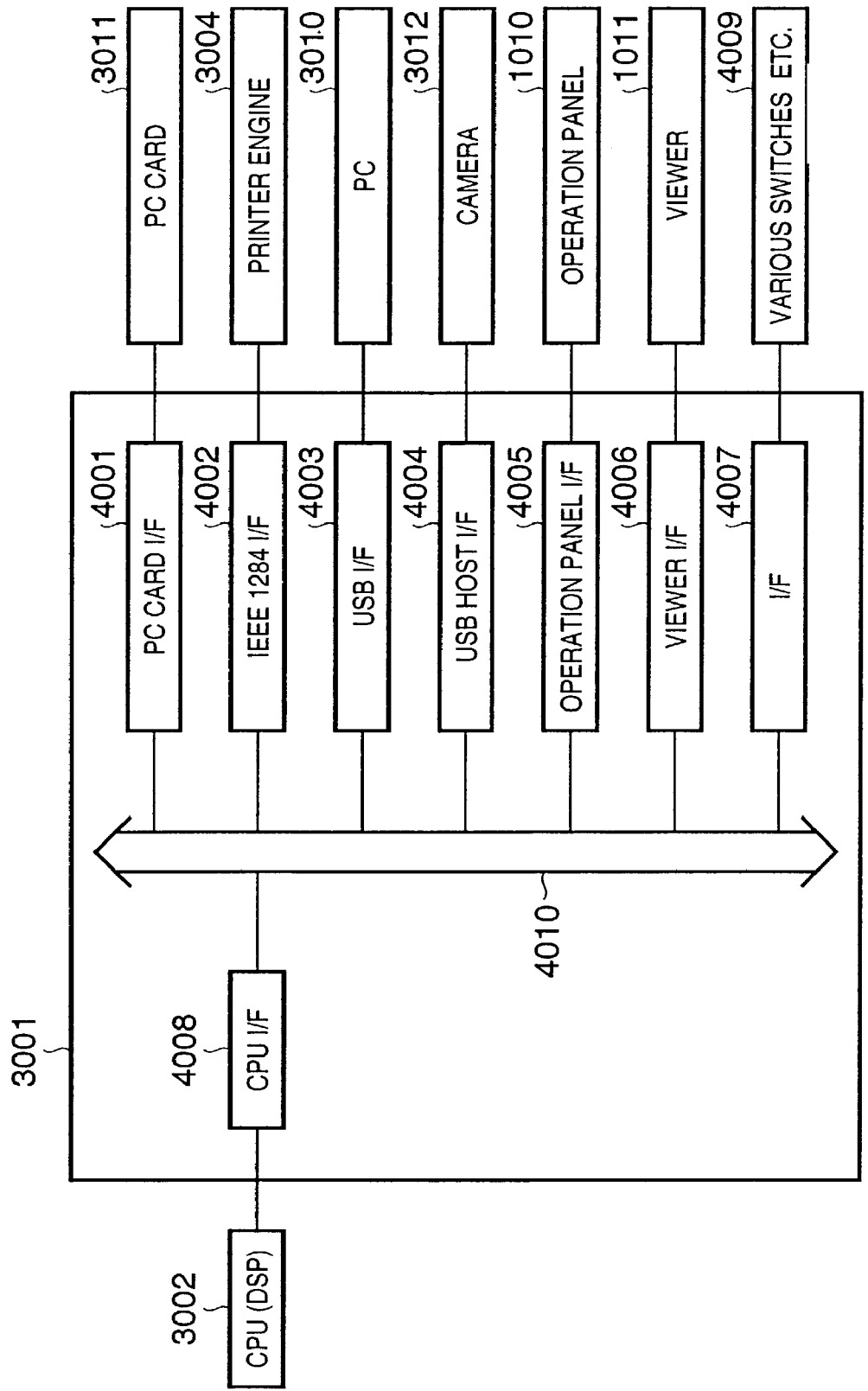
FIG. 4 is a block diagram showing the arrangement of the ASIC of the photo-direct printer apparatus according to the embodiment.

FIG. 4 is a block diagram mainly showing the arrangement of the ASIC 3001. Also in FIG. 4, the same reference numerals as in the foregoing drawings denote the same parts, and a description thereof will be omitted.

Reference numeral 4001 denotes a PC card interface which reads image data stored in the mounted PC card 3011 or writes data in the PC card 3011; and numeral 4002 denotes an IEEE 1284 interface which exchanges data with the printer engine 3004. The IEEE 1284 interface is a bus used to print image data stored in the digital camera 3012 or PC card 3011. Reference numeral 4003 denotes a USB interface which exchanges data with the PC 3010; numeral 4004 denotes a USB host interface which exchanges data with the digital camera 3012; numeral 4005 denotes an operation panel interface which receives various operation signals from the operation panel 1010 or outputs display data to the display 1006; numeral 4006 denotes a viewer interface which controls display of image data on the viewer 1011; numeral 4007 denotes an interface which controls an interface between various switches, an LED 4009, and the like; numeral 4008 denotes a CPU interface which controls data exchange between these interfaces and the DSP 3002; and numeral 4010 denotes an internal bus (ASIC bus) which is connected to these units.

The outline of the operation based on the above arrangement will be described.

<General PC Printer Mode>

The general PC printer mode is a print mode in which an image is printed on the basis of print data from the PC 3010.

In this PC printer mode, when data from the PC 3010 is input via the USB bus connector 1013, the data is directly sent to the printer engine 3004 via the USB bus hub 3008 and USB bus 3021 (FIG. 3). Printing is executed based on the data from the PC 3010.

<Direct Print Mode from PC Card>

When the PC card 3011 is mounted/dismounted in/from the card slot 1009, an interrupt occurs, and the DSP 3002 can detect mounting/dismounting (removal) of the PC card 3011. If the PC card 3011 is mounted, image data which is compressed (e.g., JPEG-compressed) and stored in the PC card 3011 is read out and stored in the memory 3003. The compressed image data is decompressed and stored in the memory 3003 again. If printing of the stored image data is designated on the operation panel 1010, conversion from an RGB signal to a YMCK signal, gamma correction, error diffusion, and the like are executed to convert the data into print data printable by the printer engine 3004. The resultant data is output to the printer engine 3004 via the IEEE 1284 interface 4002 to print the data.

<Direct Print Mode from Camera>

Figure 5:
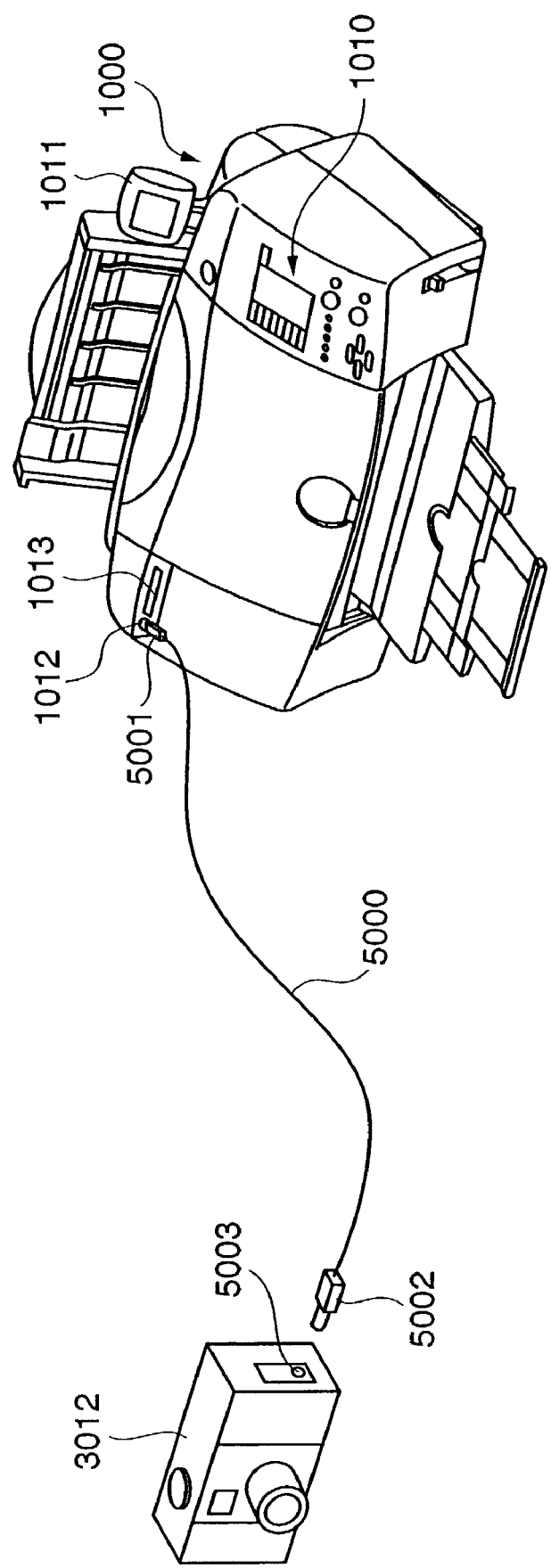
FIG. 5 depicts a view for explaining connection between the photo-direct printer apparatus and a digital camera according to the embodiment.

FIG. 5 is a view for explaining connection between the photo-direct printer apparatus 1000 and the digital camera 3012 according to this embodiment.

In FIG. 5, a cable 5000 comprises a connector 5001 connected to the connector 1012 of the printer apparatus 1000, and a connector 5002 connected to a connector 5003 of the digital camera 3012. The digital camera 3012 can output via the connector 5003 image data saved in an internal memory. The digital camera 3012 can adopt various arrangements such as one incorporating a memory as a storage means and one having a slot for mounting a detachable memory. By connecting the printer apparatus 1000 and digital camera 3012 via the cable 5000 shown in FIG. 5, image data from the digital camera 3012 can be directly printed by the printer 1000.

Figure 6:
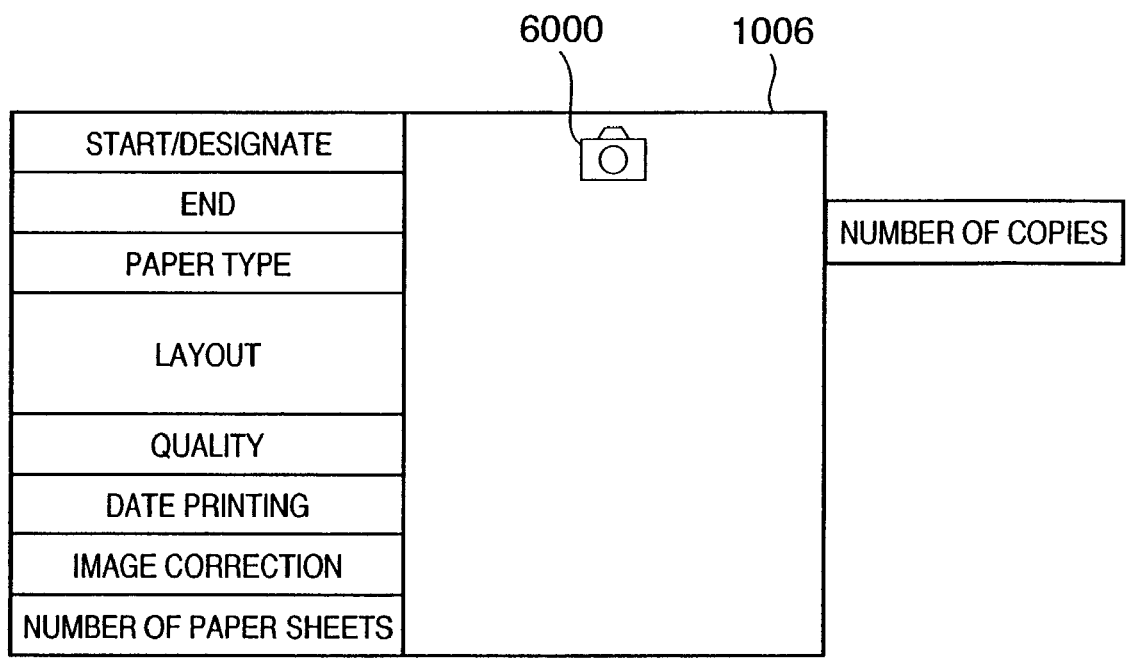
FIG. 6 depicts a view showing a display example on the display of the operation panel when the photo-direct printer apparatus and digital camera according to the embodiment are connected.

FIG. 6 depicts a view showing the display state of the display 1006 of the operation panel 1010 when the digital camera 3012 is connected to the printer apparatus 1000. In this case, the display 1006 displays only a camera mark 6000. The display and operation on the operation panel 1010 are invalidated, and image display on the viewer 1011 is also invalidated. As subsequent operation, only key operation on the digital camera 3012 and image display on the display (not shown) of the digital camera 3012 are valid. The user can designate printing by using the digital camera 3012.

Processing in the photo-direct printer apparatus 1000 according to the embodiment based on the above arrangement will be explained with reference to flow charts shown in FIGS. 7 to 12. This processing is executed by multitask processing by the CPU of the DSP 3002.

Figure 7:
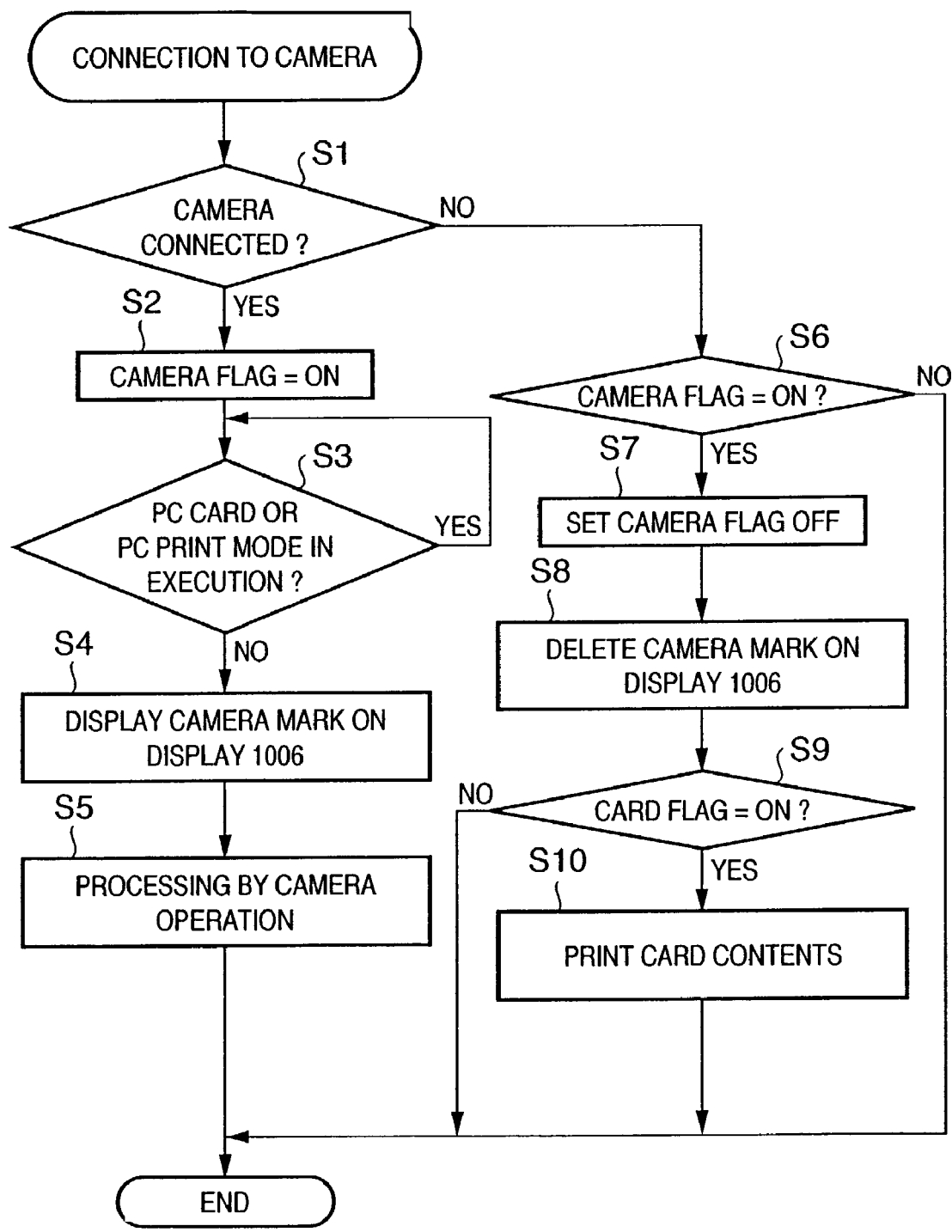
FIG. 7 is a flow chart showing processing when the photo-direct printer apparatus and digital camera according to the embodiment are connected.

FIG. 7 is a flow chart showing processing when the printer apparatus 1000 and digital camera 3012 are connected.

In step S1, the CPU checks whether the digital camera 3012 has been connected to the USB bus by a USB host task. If YES in step S1, the procedure proceeds to step S2 and sets an "ON" camera flag of the memory 3003 representing that the digital camera 3012 has been connected. Then proceeds to step S3 and checks whether the print mode by the PC card 3011 or the print mode based on data from the PC 3010 is being executed. If YES in step S3, it waits until the end of the mode, and advances to step S4. The camera mark 6000 is displayed on the display 1006 of the operation panel 1010, and notifies the user of connection of the digital camera 3012. The flow advances to step S5, in accordance with an operation instruction input from the operation unit of the digital camera 3012, image data from the digital camera are received and an image which is sensed by the digital camera 3012 and stored in the storage medium (memory card) of the camera 3012 or the memory, is printed.

If the digital camera 3012 is not connected but its connection is canceled, i.e., the digital camera 3012 is disconnected in step S1, the process proceeds to step S6 and checks whether the camera flag is ON, i.e., whether the camera 3012 has been connected and is just disconnected. If YES in step S6, the process proceeds to step S7, sets the camera flag OFF, and deletes the camera mark 6000 displayed on the display 1006 in step S8. The process advances to step S9 and checks whether a card flag representing mounting of the PC card 3011 is ON. If YES in step S9, the process advances to step S10 for read of image data from the PC card 3011 which has been invalid, and print processing of the readout image data. These processes are implemented because reading process of image data from the PC card 3011 and its print processing process have been suspended while the digital camera 3012 is connected. If NO in step S6 or S9, the CPU ends the processing.

Figure 8:
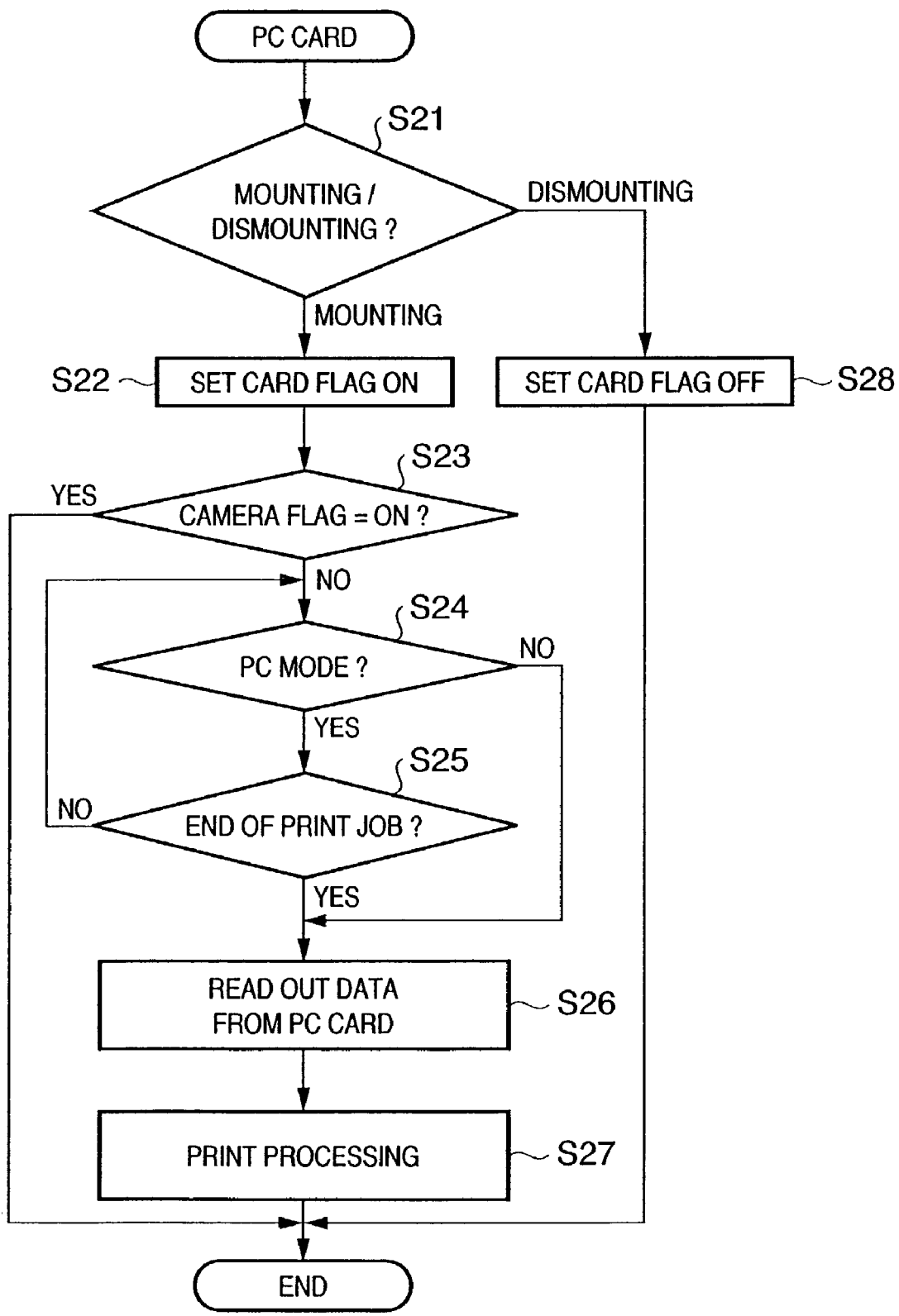
FIG. 8 is a flow chart for explaining processing along with mounting/dismounting of a PC card in the photo-direct printer apparatus according to the embodiment.

FIG. 8 is a flow chart for explaining processing along with mounting of the PC card 3011 into the main body of the printer apparatus 1000 or dismounting from the main body.

Mounting/dismounting of the PC card 3011 is detected by an interrupt. In step S21, it is checked whether the PC card 3011 is mounted or dismounted. If the PC card 3011 is mounted, the process proceeds to step S22 and sets an "ON" card flag (in the memory 3003) representing that the PC card 3011 is mounted. Then, the process advances to step S23 and it is checked based on the camera flag (in the memory 3003) whether the camera 3012 has been connected. If the camera flag is ON, the CPU ends the processing without receiving data.

If the camera flag is OFF, the process proceeds to step S24 and it is checked whether a print job is being executed in the PC mode, i.e., in accordance with a print instruction from the PC 3010. If NO in step S24, the process proceeds to step S26; if YES, to S25, waits until the print job ends, and then the process advances to step S26. In step S26, data is read out from the PC card 3011 in accordance with an operation instruction from the operation panel 1010. In step S27, the readout image data is printed in accordance with an instruction from the operation panel 1010.

If the PC card 3011 is dismounted in step S21, the process proceeds to step S28, the card flag is reset (OFF), and it is stored that the PC card 3011 has been dismounted.

Figure 9:
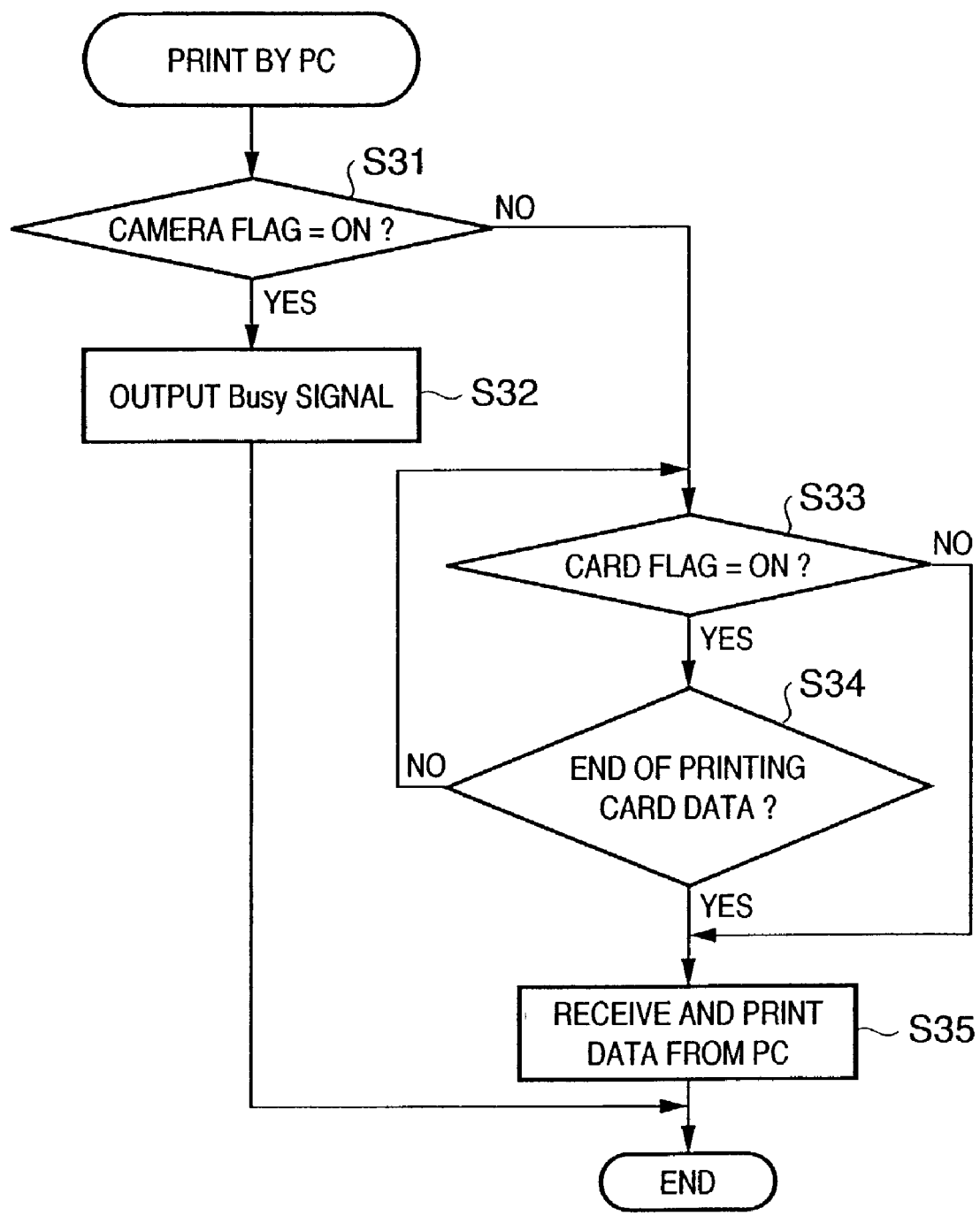
FIG. 9 is a flow chart for explaining processing of receiving and printing print data from a PC in the photo-direct printer apparatus according to the embodiment.

FIG. 9 is a flow chart for explaining processing of receiving and printing print data from the PC 3010.

Upon reception of print data from the PC 3010, in step S31, it is checked whether the camera flag is ON, i.e., the digital camera 3012 has been connected. If YES in step S31, the process advances to step S32, a busy signal is output to the PC 3010, and it notifies the PC 3010 that image data from the PC 3010 cannot be printed.

If NO in step S31, the process advances to step S33 and it is checked whether the card flag is ON, i.e., the PC card 3011 has been connected. If NO in step S32, the process proceeds to step S35, receives data from the PC 3010, and prints it. If YES in step S32, the process proceeds to step S34 and it is checked whether print processing of image data from the PC card 3011 is being executed. If NO in step S34, the process returns to step S33, and waits until printing of image data from the PC card 3011 ends. Then, the process proceeds from step S34 to step S35 and executes a general PC printer operation of receiving and printing image data from the PC 3010.

Figure 10:
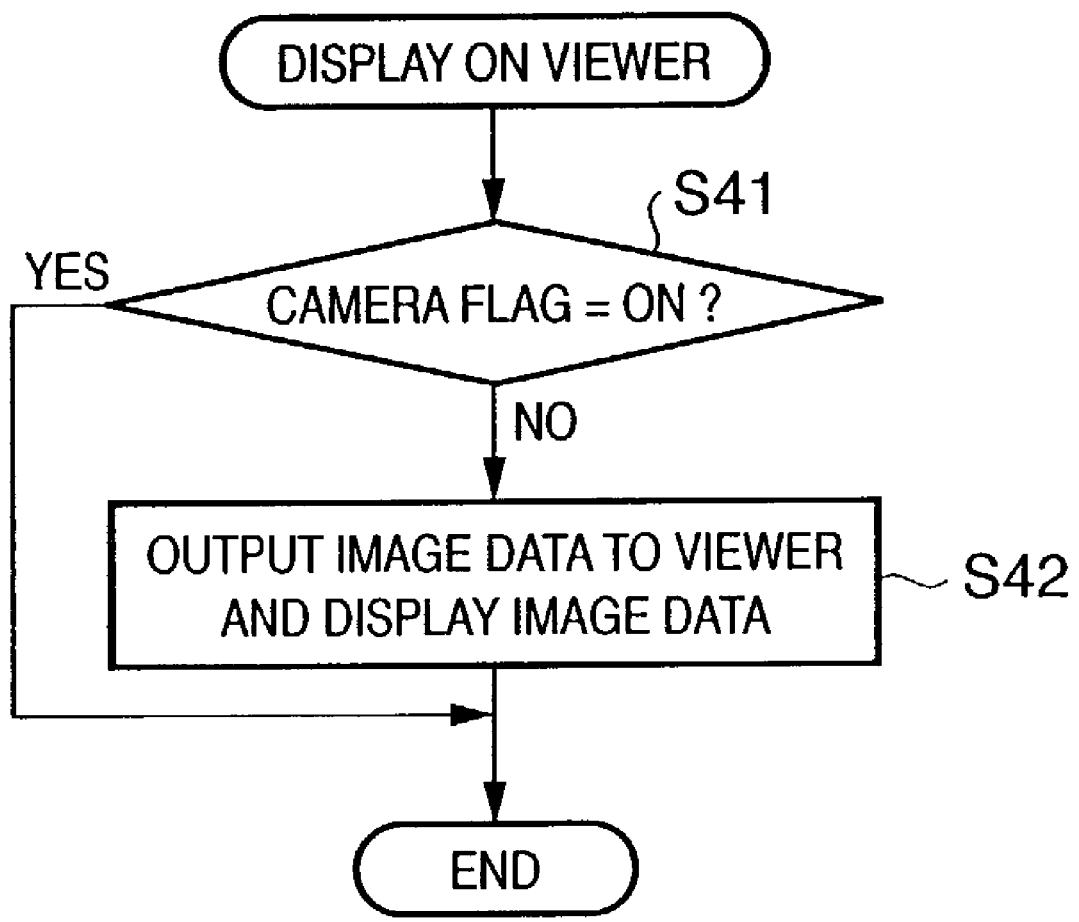
FIG. 10 is a flow chart for explaining image display processing on a viewer in the photo-direct printer apparatus according to the embodiment.

FIG. 10 is a flow chart for explaining image display processing on the viewer 1011.

If a display event to the viewer 1011 occurs, the process proceeds to step S41 and it is checked whether the camera flag is ON. If the camera flag is not ON, i.e., the camera 3012 is not connected, the process proceeds to step S42, outputs data to be displayed to the viewer 1011, and displays the display-designated image. If the camera flag is ON, i.e., the digital camera 3012 has been connected, the CPU ends the processing.

In this manner, image display on the viewer 1011 is inhibited while the digital camera 3012 is connected.

Figure 11:
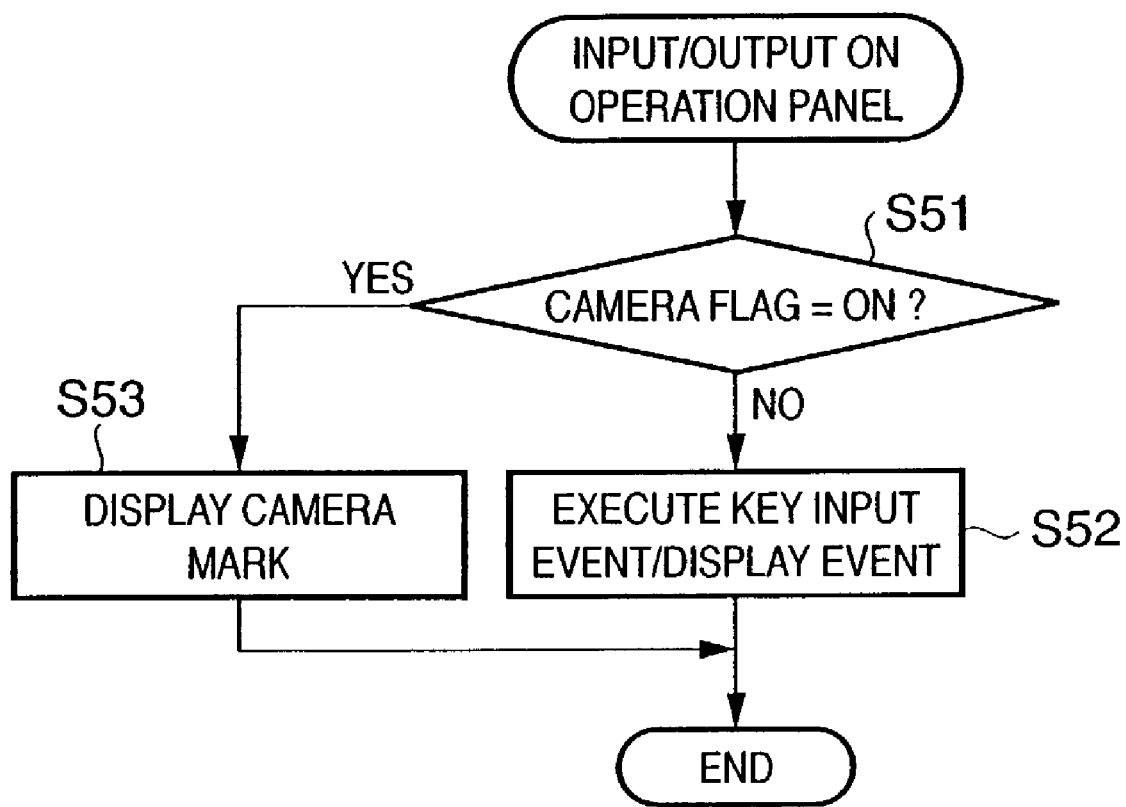
FIG. 11 is a flow chart showing input/output control of the operation panel in the photo-direct printer apparatus according to the embodiment.

FIG. 11 is a flow chart showing input/output control with the operation panel 1010.

If a key input event on the operation panel 1010 or a display event to the display 1006 occurs, the process proceeds to step S51 and it is checked whether the camera flag is ON. If NO in step S51, the process proceeds to step S52 and executes processing corresponding to the generated key input event or display event. If the camera flag is ON, i.e., the digital camera 3012 has been connected, the process proceeds to step S53, displays the above-described camera mark 6000 on the display 1006, and ends the processing.

Key operation on the operation panel 1010 becomes invalid while the digital camera 3012 is connected.

Figure 12:
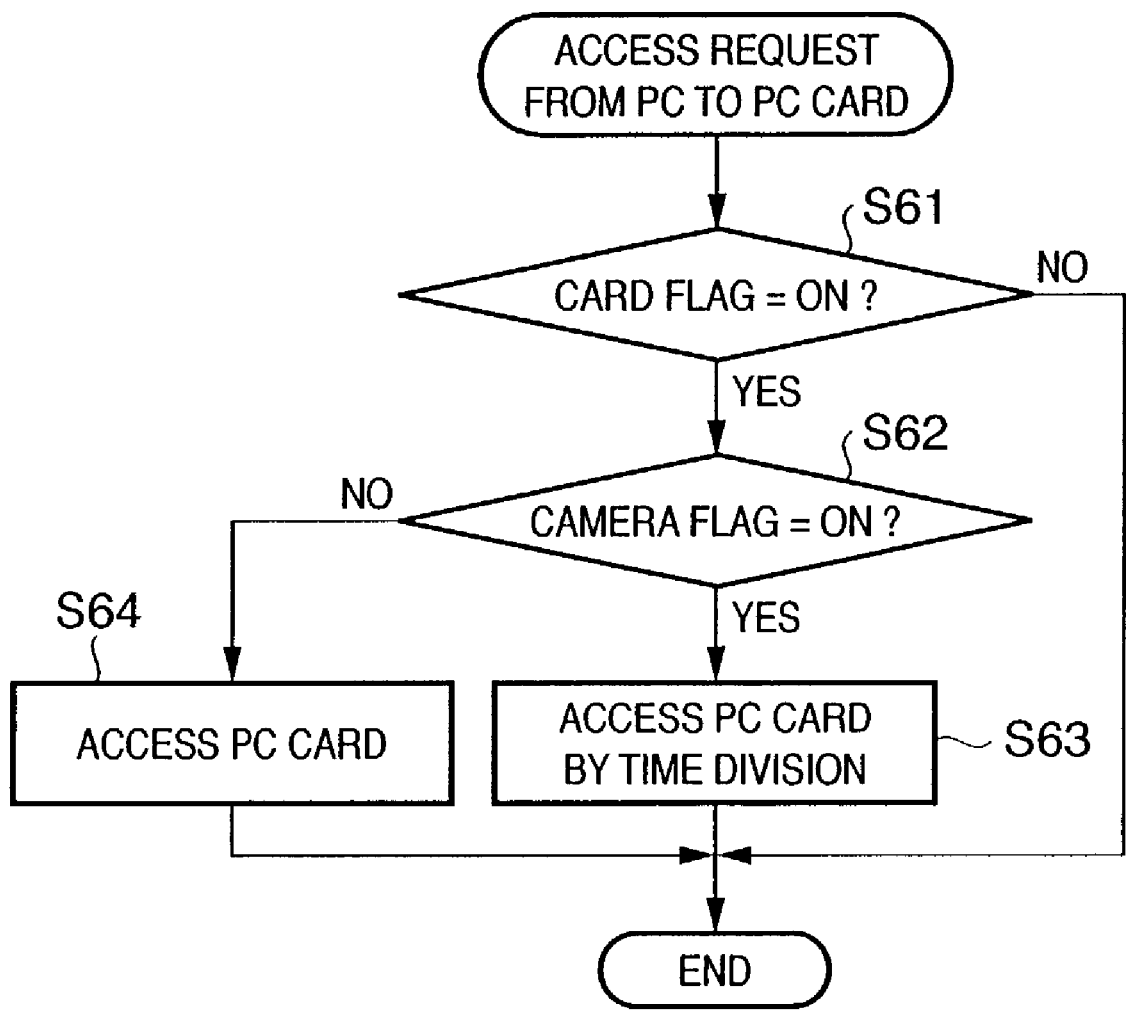
FIG. 12 is a flow chart for explaining access request processing from the PC to the PC card in the photo-direct printer apparatus according to the embodiment.

FIG. 12 is a flow chart showing access from the PC 3010 to the PC card 3011 while the PC 3010 is connected to the printer 1000 via the USB bus connector 1013.

If an access request from the PC 3010 to the PC card 3011 is input, the process proceeds to step S61 and it is checked whether the card flag is ON, i.e., the PC card 3011 has been mounted. If NO in step S61, this means that the PC card 3011 is not mounted. The CPU notifies the PC 3010 of a message to this effect, and ends the processing. If YES in step S61, the process proceeds to step S62 and it is checked whether the camera flag is ON, i.e., the digital camera 3012 has been connected. If YES in step S62, the process advances to step S63, and the time period for data exchange between the printer 1000 and the digital camera 3012 is divided into plural periods, and an access from the PC 3010 to the PC card 3011 is permitted in divided periods. If NO in step S62, the process advances to step S64, and permits the PC 3010 to write image data in the PC card 3011 or read out image data from the PC card 3011.

Thus, even while the digital camera 3012 is connected, the PC 3010 can access the PC card 3011 mounted in the printer 1000 in a time sharing.

In the above description, the top priority is given to digital camera operation when the digital camera 3012 is connected. For example, which of the digital camera 3012, PC card 3011, and PC 3010 is given the top priority may be arbitrarily set.

Alternatively, the top priority may be given to the digital camera 3012 as a default, and manually given to the PC card 3011 or PC 3010 by the user.

For example, a switch which always enables display on the viewer 1011 maybe arranged, and even when the digital camera 3012 is connected, image data from the camera 3012 may be displayed on the viewer 1011. The switch for this setting may also be arranged on, e.g., the operation panel 1010, or may be another switch on the printer apparatus 1000.

The present invention may be applied to a system constituted by a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiment is supplied to a system or apparatus, and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention. The functions of the above-described embodiment are realized when the computer executes the readout program codes. Also, the functions of the above-described embodiment are realized when an OS (Operating System) running on the computer performs part or all of actual processing on the basis of the instructions of the program codes.

The functions of the above-described embodiment are also realized when the program codes readout from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

As has been described above, according to the above-described embodiment, a printer apparatus which is connected to a PC, memory card, and digital camera, receives image data from them, and prints the image data can receive and print image data from the PC, memory card, and digital camera in the order of priority. Printing of image data from a device or memory not intended by the user can be prevented.

In the above-described embodiment, the image supply device is a digital camera serving as an image sensing apparatus. However, the present invention is not limited to this, and the image supply device may be a digital video camera or an apparatus which has a storage medium for storing image data and can read out image data from the storage medium and output the data. In recent years, there is known a cell phone with a function of saving sensed or received image data. Such a cell phone may be connected via a connection cable, instead of a digital camera described in the embodiment.

As a portable information terminal, PDAs (Personal Digital Assistances) with a liquid crystal monitor capable of displaying an image and a memory capable of saving a sensed image are recently being available. Such a PDA may be connected to the printer apparatus 1000 of the embodiment via a connection cable, and may store image data saved in the PDA, similar to the digital camera of the above-described embodiment.

According to the photo-direct printer apparatus of this embodiment, one printer apparatus can implement the functions of a PC printer, camera printer, and memory printer.

The present invention is not limited to the above embodiments and various changes and modifications can be made within the spirit and scope of the present invention. Therefore, to apprise the public of the scope of the present invention, the following claims are made.

What is claimed is:

1. A printing apparatus which prints an image on the basis of received image data, comprising:
    a mounting unit in which a storage medium storing the image data is mounted;
    a terminal for connecting an image supply device for supplying the image data;
    processing means for processing the image data input via the mounting unit or the terminal;
    an operation unit adapted to be operated by a user and input an instruction and data;
    detection means for detecting whether the image supply device has been connected via the terminal;
    invalidation means for invalidating input of the image data from the storage medium mounted in the mounting unit and operation on the operation unit when said detection means detects that the image supply device has been connected;
    image print control means for printing the image on the basis of the image data from the image supply device;
    interface means for connecting a host computer; and
    means for permitting access from the host computer to the storage medium via said interface means even when said detection means detects the image supply device has been connected.

2. The apparatus according to claim 1, wherein the printing apparatus further comprises a display unit for displaying the image to be printed, and said invalidation means invalidates the image display on the display unit when said detection means detects that the image supply device has been connected.

3. The apparatus according to claim 2, wherein the display unit is detachable from a main body of the printing apparatus.

4. The apparatus according to claim 1, wherein the operation unit comprises a display, and the printing apparatus further comprises display control means for displaying a predetermined image on the display when said detection means detects that the image supply device has been connected.

5. The apparatus according to claim 1, wherein the image supply device includes a digital camera.

6. A printing apparatus which prints an image on the basis of received image data comprising:
    a mounting unit in which a memory card storing image data is mounted;
    a first terminal for connecting an image supply device for supplying sensed image data:
    a second terminal for connecting a computer device;
    image processing means for processing the image data input via the mounting unit or the first terminal;
    an operation unit adapted to be operated by a user and input an instruction and data;
    detection means for detecting whether or not the image supply device has been connected via the first terminal;
    invalidation means for invalidating input of image data from the memory card mounted in the mounting unit and operation on the operation unit when said detection means detects that the image supply device has been connected;
    print control means for controlling to print an image on the basis of the image data from the image supply device;
    interface means for connecting a host computer; and
    means for permitting access from the host computer to the memory card via said interface means even when said detection means detects the image supply device has been connected.

7. A printing apparatus which prints an image on the basis of received image data, comprising:
    a mounting unit in which a memory card storing image data is mounted;
    a first terminal for connecting an image supply device for supplying image data;
    a second terminal for connecting a computer device;
    image processing means for processing the image data input via the mounting unit or the first terminal;
    an operation unit adapted to be operated by a user and input an instruction and data;
    detection means for detecting whether or not the image supply device has been connected via the first terminal;
    selection means for selecting which of the memory card, the image supply device, and the computer device is given priority for data processing;
    print control means for controlling to print an image on the basis of image data from one of the memory card, the image supply device, and the computer device, which is selected by said selection means;
    interface means for connecting a host computer; and
    means for permitting access from the host computer to the memory card device via said interface means even when said detection means detects the image supply device has been connected.

8. A control method of controlling a printing apparatus for printing an image on the basis of received image data, comprising:
    a detection step of detecting whether an image supply device has been connected;
    an invalidation step of invalidating input of the image data from a mounted storage medium and user operation on an operation unit when connection of the image supply device is detected in said detection step;
    a print control step of controlling to print the image on the basis of the image data from the image supply device; and
    a step of permitting access from a host computer to the storage medium even when connection of the image supply device is detected in said detection step.

9. The method according to claim 8, wherein in said invalidation step, an image display on a display unit is invalidated when connection of the image supply device is detected in said detection step.

10. The method according to claim 9, wherein the display unit is detachable from a main body of the printing apparatus.

11. The method according to claim 8, further comprising a display control step of displaying a predetermined image when connection of the image supply device is detected in said detection step.

12. The method according to claim 8, wherein the image supply device includes a digital camera.

13. A computer readable storage medium storing a program for executing the control method defined in claim 8.

14. A program stored on a computer executable medium which executes the control method defined in claim 8.

15. A control method for a printing apparatus for printing an image on the basis of received image data, comprising:

a detection step of detecting whether an image supply device has been connected via a first terminal for connecting the image supply device for supplying the image data;

an invalidation step of, when connection of the image supply device is detected in said detection step, invalidating input of the image data from a memory card mounted in a mounting unit for mounting the memory card storing image data, and operation on an operation unit which is operated by a user and inputs an instruction and data;

a print control step of controlling to print an image on the basis of image data from the image supply device in accordance with an operation on the image supply device; and a step of permitting access from a host computer to the memory card even when connection of the image supply device is detected in said detection step.

16. A control method for a printing apparatus for printing an image on the basis of received image data, comprising:

a detection step of detecting whether or not an image supply device has been connected via a first terminal for connecting the image supply device for supplying the image data;

a selection step of selecting which of a memory card, the image supply device, and a computer device is given priority for data processing;

a print control step of controlling to print the image on the basis of one of the image data from the memory card, the image supply device, and the computer device, which is selected in said selection step; and a step of permitting access from a host computer to the memory card even when connection of the image supply device is detected in said detection step.

* * * * *

UNITED STATES PATENT AND TRADEMARK OFFICE
CERTIFICATE OF CORRECTION

PATENT NO. : 7,057,750 B2  
APPLICATION NO. : 10/254506  
DATED : June 6, 2006  
INVENTOR(S) : Tatsuya Tanaka It is certified that error appears in the above-identified patent and that said Letters Patent is hereby corrected as shown below:

COLUMN 4:
Line 29, "signal" should read -- signals --.

COLUMN 8:
Line 39, "readout" should read -- read out --; and
Line 66, "Assistances)" should read -- Assistants) --.

COLUMN 9:
Line 57, "data" should read -- data, --; and
Line 62, "data:"should read -- data; --.

COLUMN 11:
Line 3, "computer readable" should read -- computer-readable --.

Signed and Sealed this

Nineteenth Day of December, 2006

JON W. DUDAS
*Director of the United States Patent and Trademark Office*